Feb. 16, 1932.    J. J. BARRY    1,845,645
FILLETING MACHINE
Filed Jan. 24, 1929    2 Sheets-Sheet 1
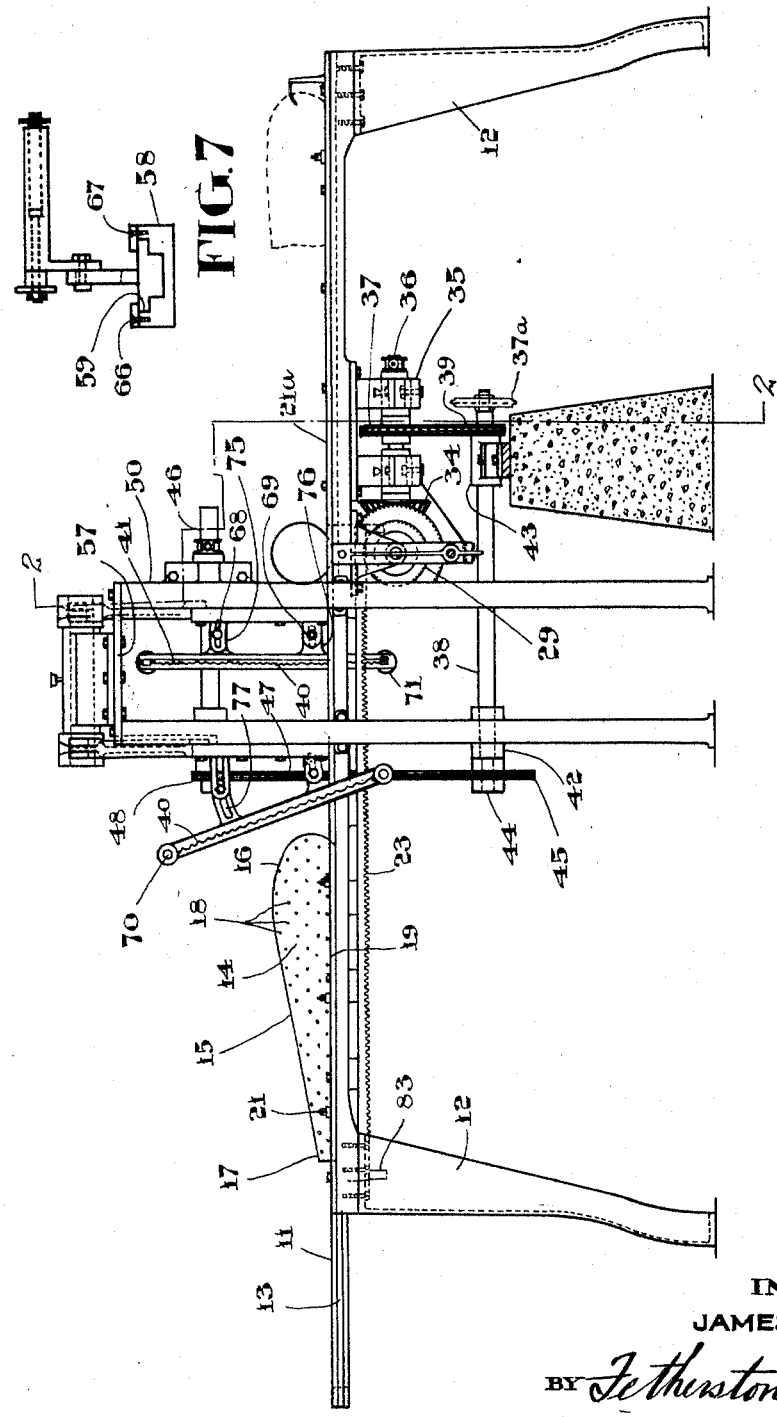
INVENTOR
JAMES.J.BARRY
BY Fetherstonhaugh & Co
ATTORNEYS Feb. 16, 1932.  J. J. BARRY  1,845,645
FILETING MACHINE
Filed Jan. 24, 1929  2 Sheets-Sheet 2
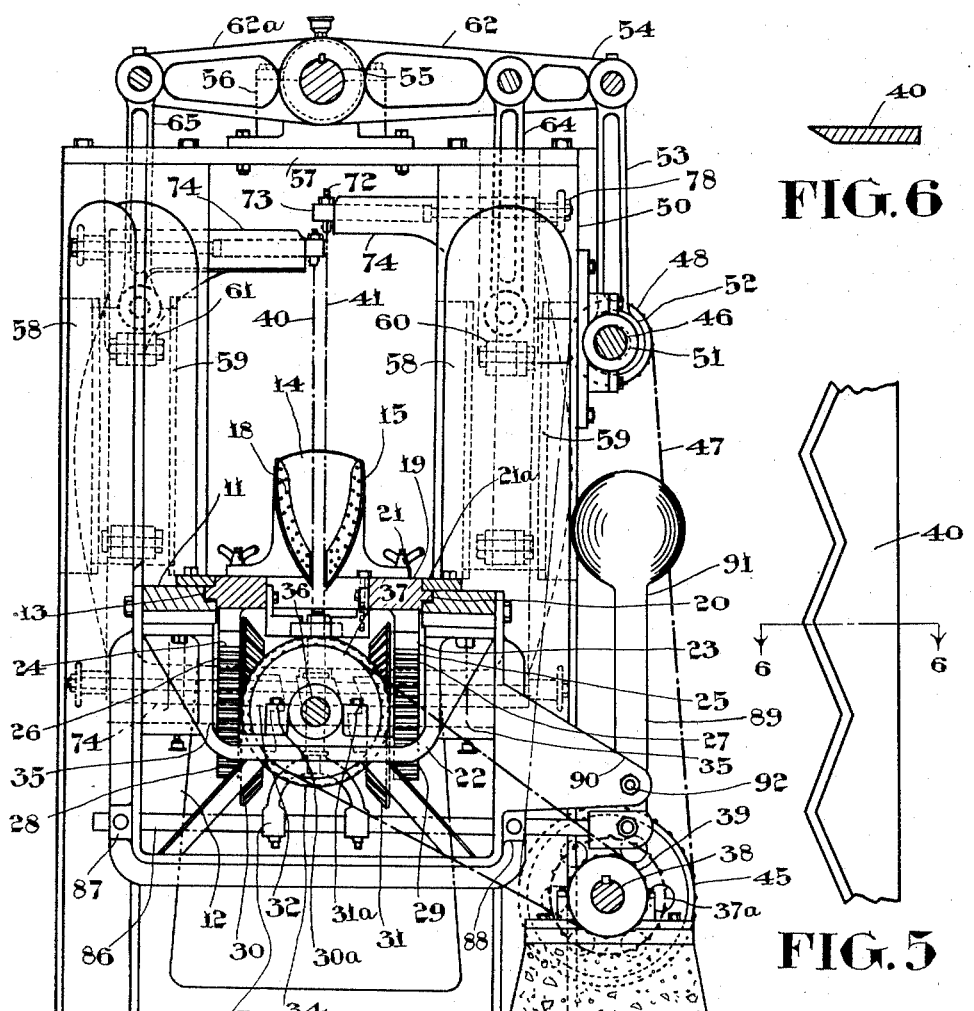
FIG.6
FIG.5
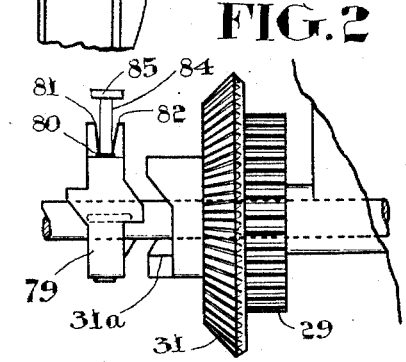
FIG.4
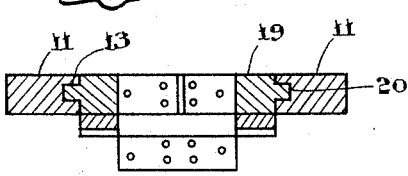
FIG.3
INVENTOR
JAMES J BARRY
BY Fetherstonhaugh & Co
ATTORNEYS Patented Feb. 16, 1932

1,845,645

UNITED STATES PATENT OFFICE

JAMES J. BARRY, OF HALIFAX, NOVA SCOTIA, CANADA, ASSIGNOR TO MARITIME FISH CORPORATION LIMITED, OF MONTREAL, QUEBEC, CANADA

FILLETING MACHINE

Application filed January 24, 1929, Serial No. 334,819, and in Canada November 11, 1927.

This invention relates to new and useful improvements in filleting machines and particularly to machines for cutting fish into fillets and removing the backbone therefrom and the main object of the invention is to provide a machine of simple construction which will fillet fish mechanically with a minimum of handling and waste.

Another object is to provide a filleting machine which will accommodate a great variety of fish and which will automatically position same during the filleting process.

A further object is to provide a machine which will be quickly and easily adjusted and which, while in operation, will be easily controlled.

A still further object is to provide a fish filleting machine which will shear or cut the flesh from the bone in a clean manner.

According to my invention, I provide a fish carrier which automatically positions the fish for filleting. The carrier is moved back and forth on a table toward and away from a pair of oscillatably mounted knives, the teeth of which are so arranged that they slice or cut the flesh from the bone in a clean manner. Means are provided for holding the flesh after it has been cut from the bone, so that the bone may drop into a suitable receptacle. Suitable means are provided for regulating the stroke of the machine.

In the drawings which illustrate my invention:

Figure 1 is a part side elevation of the filleting machine.

Figure 2 is a sectional end elevation taken on the line 2—2 Figure 1.

Figure 3 is an enlarged sectional end elevation showing the table construction and the position of the travelling racks thereon.

Figure 4 is an end elevation of the clutch mechanism for operating the carrier.

Figure 5 is an enlarged part side elevation of the fish cutting knives.

Figure 6 is a sectional plan taken on the line 6—6 Figure 5.

Figure 7 is a sectional plan showing one frame member and the manner of attaching the knives thereto.

Referring more particularly to the drawings, 11 designates the guide table which is made in two sections each carried on the legs 12. The sections are spaced apart and grooves or guides 13 are formed in the adjacent edges to receive the fish carrying mechanism. The fish, designated as 14, is placed between a pair of concave curved frame members 15, spaced from one another, and so shaped and positioned that they form a supporting receptacle within which fish of different sizes may be placed and operatively held during the working of the machine. The front portions 16 of the said members 15 are preferably of greater curvature than the back portions 17, so that the fish is automatically positioned and pressed into the receptacle while being filleted. The sections 15 are perforated, as designated 18, to allow quick drainage during the movement of the machine and also to hold the fish securely. Each section 15 is secured by bolts 21 to a carrier table or frame 19 having projections 20 which fit into the guides 13 and between the table sections, as shown in Figure 3. The carrier frames are spaced a slight distance apart and may be connected at their ends by the plates 22. Secured to the underside of the sections 11 of the guide table, or formed integral therewith, are the racks 23, the teeth 24 and 25 of which are adapted to mesh with the teeth 26 and 27 of the pinions 28 and 29 respectively. The pinions are rotatably held in suitable bearings 35 secured to the guide table. The bevel wheels 30 and 31 are rotatably mounted on the pin 32 and are each provided with projecting teeth 30a and 31a which operate in the manner hereinafter described. The carrier frames are held in the guides or grooves by means of the lock plates 21a. The bevel wheels 31 and 32 engage with a crown bevel wheel 34 secured to a spindle 36 rotatably mounted in the bearings 35 secured to the underside of the guide table. A chain sprocket wheel 37 is secured to the spindle 36 between the bearings 35 and is driven from a shaft 38 to which is secured a sprocket pinion 39 and the sprocket wheel 37. The shaft 38 may be driven from any suitable source. The shaft 38 also drives the saws or filleting knives 40 and 41 and is mounted on the bearings 42 and 43. The shaft 38 is provided with an extension 44 and secured to this extension is the sprocket wheel 45 which drives a shaft 46 through the chain 47 and sprocket wheel 48 secured to said shaft 46 and these bearings are secured to the frames 50 which straddle the guide table. Mounted on or formed integral with the shaft 46 is the eccentric 51 which engages with one end 52 of a driving link 53, the other end of which is pivotally secured to the free end 54 of a rocker arm 62 secured to the rocker shaft 55. The shaft 55 is rotatably held in the bearing 56 secured to the cross member 57 of the straddling frames 50, the side members 58 of which are recessed to form guides 59 to receive the saw carriers 60 and 61. The saw carrier 60 is attached to the rocker arm 62 by means of the link 64 at a point between the rocker shaft and the eccentric link. The saw carrier 61 is attached to the lever 62 by means of the link 65 and the lever 62 is attached to the rocker shaft. The frame 50 is slotted to form guides for the saw carriers and is held in place by keeper plates 66 attached to the frame by bolts or set screws 67 arranged to clear the said saw carriers. The saw carriers are of similar construction and have outwardly extending upper and lower lugs 68 and 69. The upper lug is preferably made larger than the lower lug 69. Each lug is slotted. The saws or filleting knives 40 are bevelled at one edge and have holes 70 at each end. The lower holes engage with pins secured to the end of adjusting bolts which pass through bosses 71. The holes at the upper end of the saws engage with tensioning screws 72 passing through bolts 73 which are adjustably mounted in the bosses 74. The bosses 72 and 74 are connected together by ribs or like means to hold them apart at a predetermined distance. The lower saw attaching bolt is not shown in detail but any of the types used for hack saws may be used in this machine. The bosses have each outwardly projecting lugs 75 and 76 and slots 77 are formed in said lugs. The lugs 68 overlap the lugs 75 and the lugs 69 overlap the lugs 76 and bolts are passed through the slots to hold them together.

This construction of saw carrier mechanism allows the saws to be adjusted to any desired angle to the vertical. It also allows the saws to be moved toward and away from the centre of the machine. Further, it allows the saws to be quickly changed should they get broken or blunt during the operation of the machine. The bolts passing through the top and bottom lugs are locked in place by the nuts 78. Slidably mounted on and adapted to rotate with the pin 32 between the bevel wheels 30 and 31 is the clutch member 79. The teeth of the clutch are adapted to be brought into and out of engagement with the teeth 30a and 31a on the bevel wheels 30 and 31. Projecting upwardly from the face of the clutch are the bevelled surfaces 80 and 81. These surfaces are equidistant from the centre line of the clutch member. Projecting downwardly from the table and at one side of the centre line thereof is the projection 82 which is adapted to come in contact with the bevelled surface 80 to pull the clutch out of engagement with the clutch teeth of the bevel wheel on one side of the centre line and into engagement with the clutch teeth of the bevel wheel on the other side of the centre line. A projection 83 is provided at the other end of the table and this projection is adapted to slidably operate in the reverse direction to the clutch member. As the table slides back and forth the projections are adapted to move the clutch member so that the travelling movement of the table is reversed automatically. Fitting into the groove between the bevelled surfaces is a projection 84 formed on or made integral with a lever 85 which is secured to a shaft 86 mounted slidably but non-rotatably in bearings 87 and 88. The end of the shaft or rod 86 engages with one end of a lever 89 pivotally mounted in a bracket 90 secured to the frame. The other end 91 of the lever is weighted. The lever 89 is adapted to oscillate about the pivot 92 to hold the clutch in engagement with either one of the bevel wheels between the extreme end of its stroke.

Having thus described my invention, what I claim is:—

1. A fish filleting machine comprising a table, fish carrying and centering means slidably mounted on the table, means to move the carrying means back and forth on the table in a horizontal direction, a frame straddling said table and provided with vertically disposed legs, saw carrying members slidably attached to the legs, said carrying members having arms extending transversely of the frame above and below the table, saw cutting members mounted on the arms and adapted to be transversely and angularly adjusted with respect to the table, means to oscillate the carrying members to move the saws which pass through between portions of the carrier members to separate the flesh from the bone of the fish as it is carried past the cutting members, and means to grip the flesh and pull same clear of the carrier and allow same to return empty.

2. A fish filleting machine comprising a frame, a table, fish carrying means slidably mounted thereon, means for operating said fish carrying means, spaced vertically disposed saw carrying members slidably supported on said frame, means for operating said members, a group of spaced vertically disposed saws supported by each member for reciprocatory movement above and below said table, and cooperating means carried by each member and its adjacent group of saws, whereby the latter can be adjusted to occupy different angular positions with relation to said table.

3. A fish filleting machine comprising a frame, a table, fish carrying means slidably mounted thereon, means for operating said fish carrying means, spaced vertically disposed saw carrying members slidably supported on said frame, means for operating said members, a saw carrying frame for each member, a plurality of saws for each frame, slotted arms projecting from each member adjacent the opposed ends thereof, and corresponding arms projecting from each saw frame and adjustably connected with the arms of said member, whereby said saw frame can be arranged in different angular positions with respect to said table.

4. A fish filleting machine comprising a frame, a table, fish carrying means slidably mounted thereon, means for operating said fish carrying means including a rotatably mounted shaft, spaced vertically disposed saw carrying members slidably mounted on said frame, means operated from said shaft to reciprocate said saw members simultaneously with the operation of said fish carrying means, a vertically arranged saw carrying frame supported by each member, saws arranged in each frame, and means whereby said saw frames can be adjusted on their respective members to occupy different angular positions with relation to the table.

5. A fish filleting machine comprising a frame, a table, fish carrying means slidably mounted thereon, means for operating said fish carrying means including a rotatable shaft, spaced vertically disposed saw carrying members slidably mouned on said frame, means operated from said shaft for operating said members simultaneously in opposite directions, a saw carrying frame mounted on each member, and means whereby said frames can be adjusted on said member to occupy different angular positions with relation to the table.

6. A fish filleting machine comprising a frame, a table, fish carrying means slidably mounted thereon, means for operating said fish carrying means including a rotatably mounted shaft, spaced vertically disposed saw carrying members slidably mounted on said frame, a rocker arm, links depending from said arm and connecting said members therewith, means operated from said shaft for rocking said arm to simultaneously reciprocate said members in opposite directions, a vertically arranged saw carrying frame mounted on each member, and means whereby said frames can be adjusted on their respective members to occupy different angular positions with relation to the table.

In witness whereof, I have hereunto set my hand.

JAMES J. BARRY.